(12) United States Patent
Appleby

(10) Patent No.: US 8,523,196 B1
(45) Date of Patent: Sep. 3, 2013

(54) CONVERTIBLE CART AND CANOPY APPARATUS

(76) Inventor: Mark J. Appleby, Orefield, PA (US)

( * ) Notice: Subject to any disclaimer, the term of this patent is extended or adjusted under 35 U.S.C. 154(b) by 0 days.

(21) Appl. No.: 13/371,591

(22) Filed: Feb. 13, 2012

(51) Int. Cl.
*B62B 3/02* (2006.01)

(52) U.S. Cl.
USPC ......... 280/30; 280/32.5; 280/401; 280/47.18; 280/47.26; 280/79.2; 280/651; 280/652; 280/654; 280/762; 135/95; 160/127; 160/128

(58) Field of Classification Search
USPC ................. 280/30, 32.5, 401, 651, 652, 654, 280/47.18, 47.26, 79.11, 79.2, 79.3, 656; 296/107.01, 116; 135/95, 96, 88.1, 88.13, 135/87, 88.02, 122, 139, 140, 143, 147, 151, 135/117, 150; 160/45, 60, 65, 72, 127, 128, 160/38, 39
See application file for complete search history.

(56) References Cited

U.S. PATENT DOCUMENTS

| | | | | |
|---|---|---|---|---|
| 180,732 | A * | 8/1876 | Schapker | 135/147 |
| RE16,037 | E * | 3/1925 | Berg | 135/98 |
| 1,820,002 | A * | 8/1931 | Forrester | 135/140 |
| 2,027,984 | A * | 1/1936 | Kapp | 135/154 |
| 2,132,238 | A * | 10/1938 | Haisty | 135/95 |
| 2,137,427 | A * | 11/1938 | Thomson | 297/23 |
| 2,840,142 | A * | 6/1958 | Sands | 280/30 |
| 2,883,731 | A * | 4/1959 | Wells | 280/47.26 |
| 2,905,187 | A * | 9/1959 | Croce | 135/20.1 |
| 3,486,514 | A * | 12/1969 | Prescott | 135/90 |
| 3,606,445 | A * | 9/1971 | Wunderlich | 296/168 |
| 3,677,571 | A * | 7/1972 | Maturo et al. | 280/654 |
| 4,316,615 | A * | 2/1982 | Willette | 280/47.26 |
| 4,460,188 | A * | 7/1984 | Maloof | 280/30 |
| 5,096,257 | A * | 3/1992 | Clark | 297/184.15 |
| 5,197,754 | A * | 3/1993 | Ward | 280/655 |
| 5,269,157 | A * | 12/1993 | Ciminelli et al. | 62/457.7 |
| D345,842 | S * | 4/1994 | Sloan et al. | D34/26 |
| 5,333,885 | A * | 8/1994 | Pullman | 280/47.19 |
| 5,380,022 | A * | 1/1995 | Dennis | 280/47.35 |
| 5,380,059 | A * | 1/1995 | Felling | 297/184.15 |
| 5,447,354 | A | 9/1995 | Delp | |
| 5,636,852 | A * | 6/1997 | Sistrunk et al. | 280/30 |
| 5,660,425 | A * | 8/1997 | Weber | 296/163 |
| 5,791,363 | A * | 8/1998 | Moses | 135/143 |
| 5,921,258 | A * | 7/1999 | Francois | 135/88.03 |
| 6,533,372 | B1 | 3/2003 | McCrossin et al. | |
| 6,883,267 | B1 * | 4/2005 | Pruitt | 43/54.1 |
| 6,996,941 | B1 * | 2/2006 | Maschoff | 52/79.5 |
| 7,431,389 | B2 * | 10/2008 | Reeb et al. | 297/184.15 |
| 7,438,345 | B2 * | 10/2008 | Mrotek | 296/116 |

(Continued)

*Primary Examiner* — John R Olszewski
*Assistant Examiner* — Steve Clemmons
(74) *Attorney, Agent, or Firm* — Dale J. Ream

(57) ABSTRACT

A convertible beach cart and canopy apparatus includes a lower frame portion having front and rear support members and side members extending between opposed ends of the front and the rear support members. Wheels are coupled to opposed ends of the rear support members. The apparatus includes a rear frame portion having at least one upstanding support bar fixedly attached to the rear support member, the rear frame portion include a top support member coupled to an upper end of the at least one support bar. An upper frame portion is rotatably coupled to the top support member such that the canopy frame portion is movable between a stowed configuration generally adjacent the lower frame portion and an expanded configuration extending away from the top support member. A canopy is coupled to an end of the canopy frame portion and configured to shade an area adjacent the rear frame portion.

18 Claims, 6 Drawing Sheets

(56) References Cited

U.S. PATENT DOCUMENTS

| | | | |
|---|---|---|---|
| 7,677,591 B2* | 3/2010 | Chapman | 280/652 |
| 7,784,420 B2 | 8/2010 | Tufte | |
| 7,819,407 B1* | 10/2010 | Charitun | 280/47.18 |
| 7,963,530 B1* | 6/2011 | Garcia | 280/30 |
| 2002/0070517 A1* | 6/2002 | Ramsey | 280/47.19 |
| 2003/0085552 A1* | 5/2003 | Shapiro | 280/646 |
| 2005/0067802 A1* | 3/2005 | Lambert | 280/47.35 |
| 2005/0161916 A1* | 7/2005 | Taylor | 280/655.1 |
| 2006/0076306 A1 | 4/2006 | Bothun et al. | |
| 2007/0018486 A1* | 1/2007 | Ayers et al. | 297/184.15 |
| 2007/0261728 A1* | 11/2007 | Lin et al. | 135/20.1 |
| 2008/0048417 A1* | 2/2008 | Schroeder | 280/656 |
| 2010/0243012 A1* | 9/2010 | Lindeman et al. | 135/88.02 |
| 2011/0209738 A1* | 9/2011 | McCarty, Sr. | 135/122 |
| 2012/0111941 A1* | 5/2012 | Abel et al. | 235/386 |

\* cited by examiner

CONVERTIBLE CART AND CANOPY APPARATUS

BACKGROUND OF THE INVENTION

This invention relates to carts with canopies and, more particularly, to a convertible cart and canopy apparatus that is quickly convertible from a mobile carrying cart to a beach canopy.

Persons going to the beach, a picnic, or other recreational outing often pack the appropriate items in a basket, athletic bag, cooler, or even a wagon so as to transport the items more conveniently from an automobile to the desired location. The items to be carried may be food, beverages, beach towels, reading materials, or the like. Once situated at the desired location, the user often desires to cast shade upon the recreational site such as with a beach umbrella or other type of canopy.

Various devices have been proposed in the art for positioning a canopy over a transportation device such as a canopy over a golf cart (U.S. Pat. No. 7,431,377), a wagon having a top conversion assembly (U.S. Pat. No. 5,447,354), and a cover configured for a boat (U.S. Pat. No. 7,784,420). Although assumably effective for their intended purposes, the existing devices and proposals do not present an apparatus that completely converts from a cart to a canopy.

Therefore, it would be desirable to have a convertible cart and canopy apparatus that provides a fully functional carrying cart with wheels in a stowed configuration and a complete and stable canopy in an expanded configuration. Further, it would be desirable to have a convertible cart and canopy apparatus having a canopy that may be expanded much larger in the expanded configuration than in the stowed configuration. In addition, it would be desirable to have a convertible cart and canopy apparatus that is anchored to the ground in use and easy to move between stowed and expanded configurations.

SUMMARY OF THE INVENTION

A convertible beach cart and canopy apparatus according to the present invention includes a lower frame portion having opposed front and rear support members and opposed side members extending between opposed ends of the front and the rear support members, respectively. A pair of wheels is coupled to the opposed ends of the rear support member. The apparatus includes a rear frame portion having at least one support bar fixedly attached to the rear support member, respectively, and extending upwardly therefrom, the rear frame portion include a top support member coupled to an upper end of the at least one outer support bar. An upper frame portion is rotatably coupled to the top support member of the rear frame portion such that the canopy frame portion is movable between a stowed configuration generally adjacent the lower frame portion and an expanded configuration extending away from the top support member of the rear frame portion. A canopy is coupled to an end of the canopy frame portion and configured to shade an area rearwardly adjacent the rear frame portion.

Therefore, a general object of this invention is to provide a convertible cart and canopy apparatus that includes a cart configured to store and transport articles that selectively converts to an expansive canopy to shade a desired area.

Another object of this invention is to provide a convertible cart and canopy apparatus, as aforesaid, that is compact in the stowage configuration for transporting articles and expansive in the expanded configuration for shading a desired area from the sun.

Still another object of this invention is to provide a convertible cart and canopy apparatus, as aforesaid, that may be stabilized against becoming top heavy when the canopy is positioned rearward of the frame.

Yet another object of this invention is to provide a convertible cart and canopy apparatus, as aforesaid, that is easy to convert from the stowage configuration to the expanded configuration or the reverse.

A further object of this invention is to provide a convertible cart and canopy apparatus, as aforesaid, that is economical to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
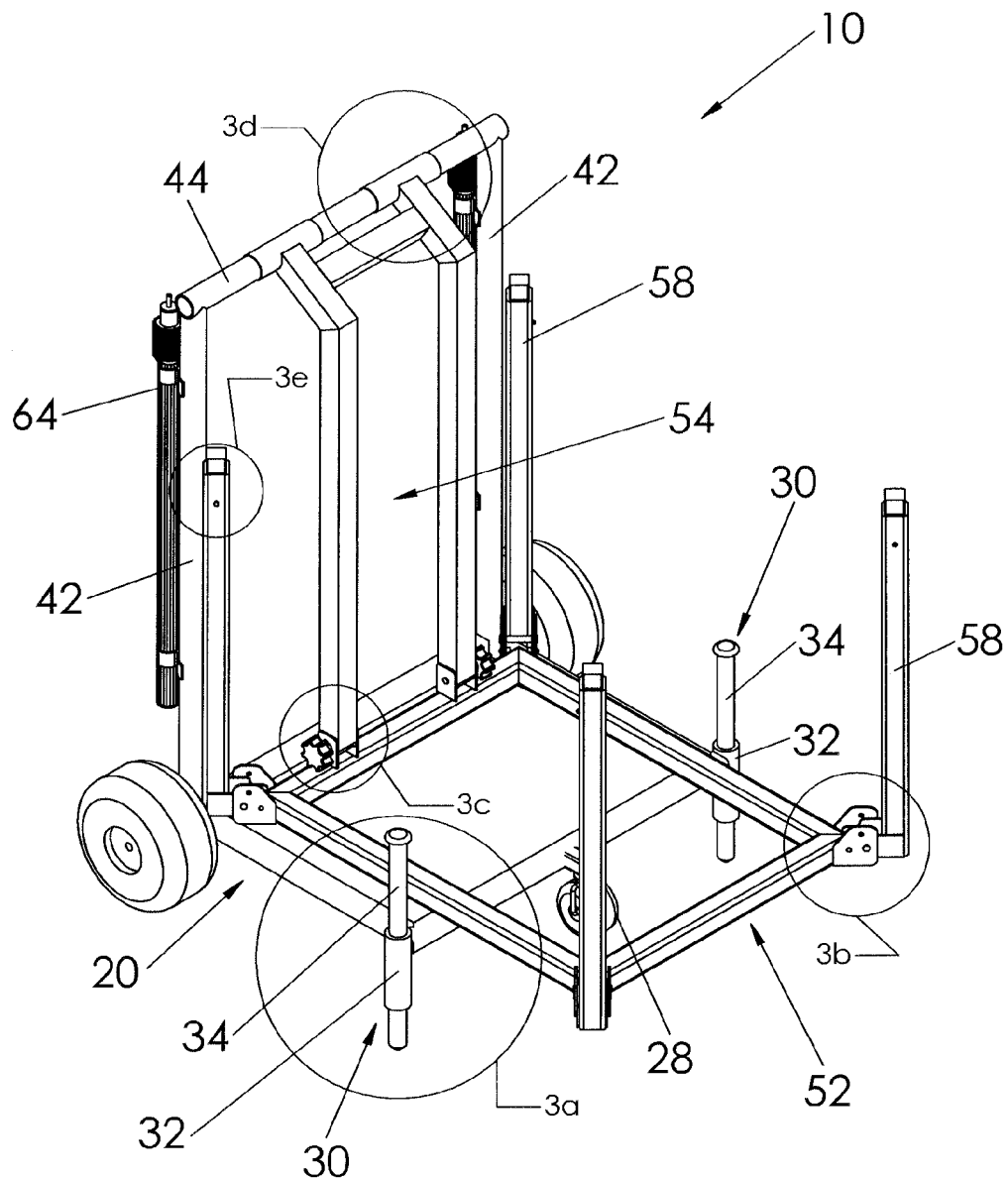
FIG. 1 is a perspective view of a convertible cart and canopy apparatus according to a preferred embodiment of the present invention shown in a stowage configuration but with the canopy removed for clarity.

A convertible beach cart and canopy apparatus according to a preferred embodiment of the present invention will now be described with reference to FIGS. 1 to 8 of the accompanying drawings. The convertible beach cart and canopy apparatus 10 may include a lower frame portion 20, a rear frame portion 40 and an upper frame portion 50 having a central framework 52 and bridge 54 connecting the upper frame portion 50 to the rear frame portion 40.

The lower frame portion 20 includes opposed front 22 and rear 24 support members with opposed side support members 25 extending between respective ends of the front 22 and rear 24 support members, respectively. Accordingly, the lower frame portion 20 may present a generally square or rectangular configuration although other configurations may also be suitable.

A pair of wheels 26 is rotatably coupled to the opposed ends of the rear support member 24 of the lower frame portion 20 (FIG. 1). It is understood that each wheel may be independently rotatably coupled to a respective end or both wheels may be coupled to one another by an axle that is coupled to the rear support member 24. Preferably, each wheel 26 includes a wide or flotation type tire that is well-suited for use in sand, such as at the beach. Another wheel 28 or wheels may be coupled to the front support member 22 to provide enhanced support and maneuverability. In one embodiment, the additional wheel 28 may be a castor-type wheel that may rotate 360 degrees in order to provide enhanced turning ability when the apparatus 10 is configured as a cart.

The rear frame portion 40 includes at least one upstanding support bar 42 that is attached at a lower end to the rear support member 24 of the lower frame portion 20 and extends upwardly therefrom. The rear frame portion 40 also includes a top support member 44 attached to an upper end of the support bar 42. In one embodiment, the at least one upstanding support bar 42 may include a pair of support bars attached to opposed ends of the rear support member 24, respectively, and extend upwardly therefrom. The top support member 44 may be a bar extending between upper ends of the pair of upstanding support bars, respectively.

Figure 2:
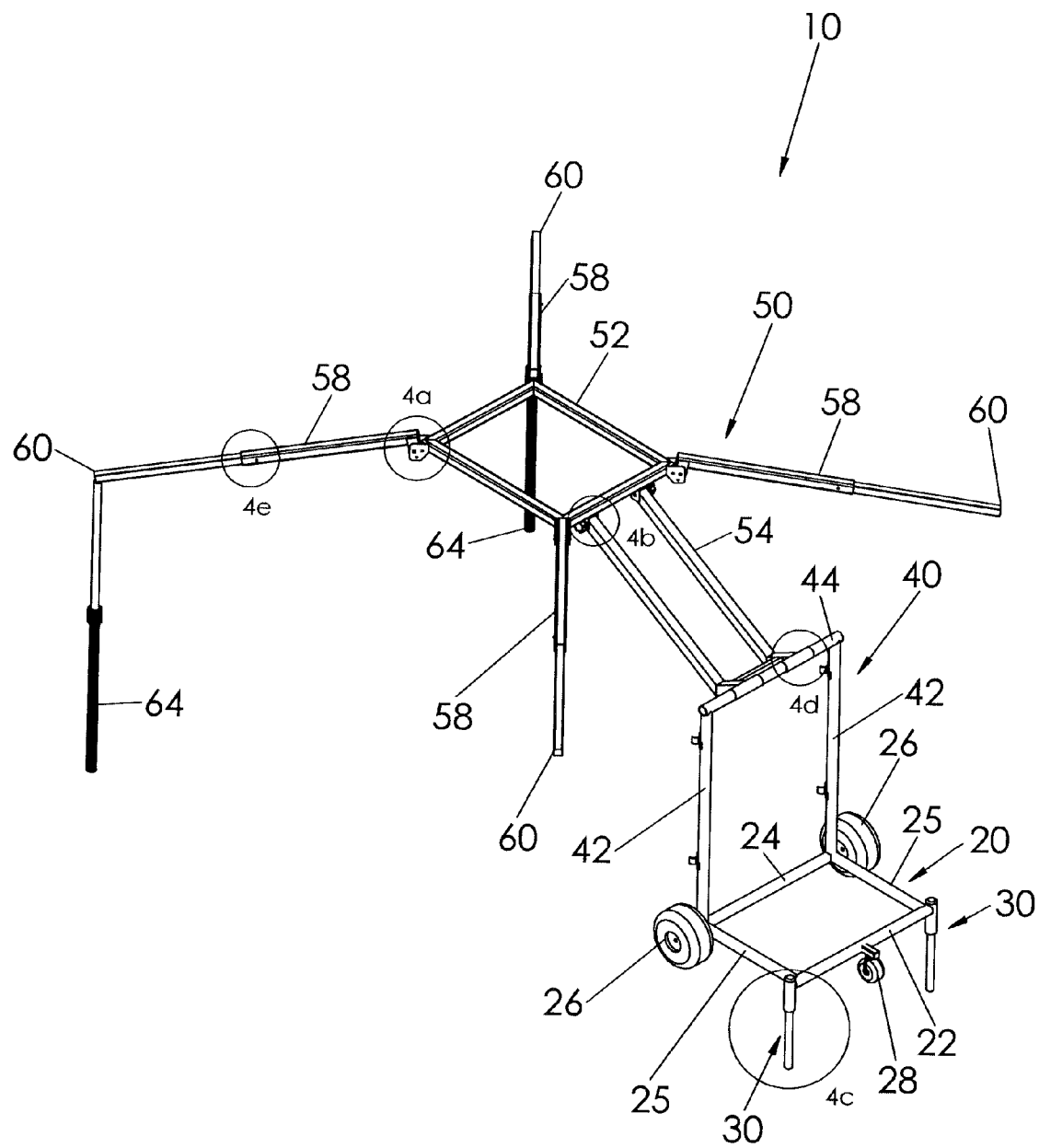
FIG. 2 is a perspective view of a convertible cart and canopy apparatus as in FIG. 1 shown in an expanded configuration.

An upper frame portion 50 may be rotatably coupled to the top support member 44 (also referred to as a top support bar) of the rear frame portion 40 and movable between a stowed configuration generally adjacent the lower frame portion 20 and an expanded configuration extending away from the top support member 44 of the rear frame portion 40. More particularly, the upper frame portion 50 may include a central framework 52 and a bridge 54. The bridge 54 may include a first end pivotally coupled to the central framework 52 (FIGS. 3b and 4b) and a second end rotatably coupled to the top support member 44 of the rear frame portion 40 (FIG. 4d). The bridge 54, therefore, is selectively movable between a stowed configuration in which the central framework is adjacent the lower frame portion (FIG. 1) and an expanded configuration in which the central framework 52 is extended away from the top support member 44 of the rear frame portion 40. Preferably, the bridge 54 is rotatable more than 180 degrees such that the central framework 52 may be selectively situated rearward of the rear frame portion 40 (FIG. 2). This enables an area rearward of the rear frame portion 40 to be shaded by the canopy 70 as will be discussed below.

Figure 4A:
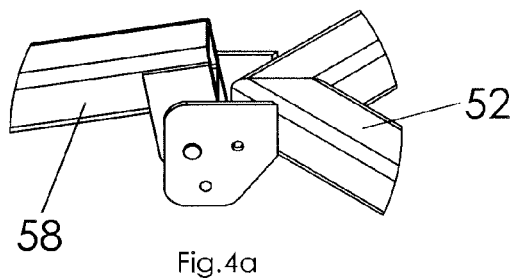
FIG. 4a is an isolated view on an enlarged scale of a portion of the apparatus taken from FIG. 2.
Figure 4C:
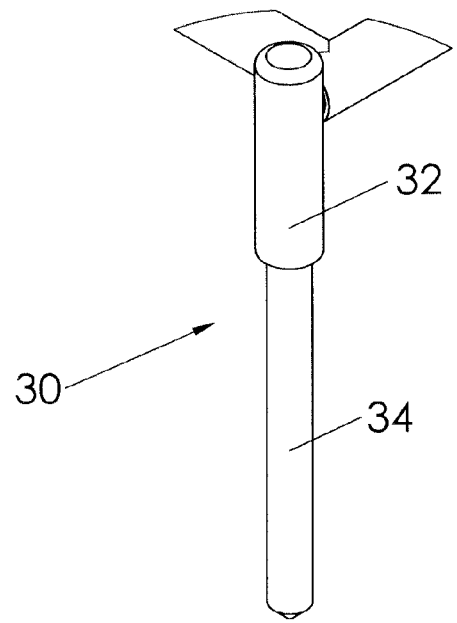
FIG. 4c is an isolated view on an enlarged scale of a portion of the apparatus taken from FIG. 2.
Figure 4B:
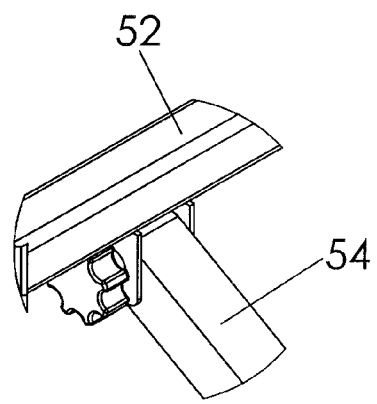
FIG. 4b is an isolated view on an enlarged scale of a portion of the apparatus taken from FIG. 2.
Figure 4D:
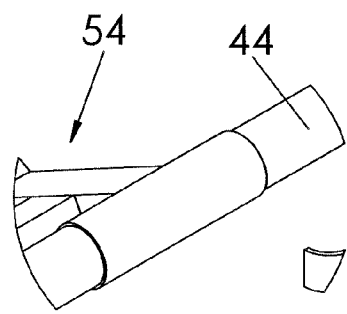
FIG. 4d is an isolated view on an enlarged scale of a portion of the apparatus taken from FIG. 2.

The bridge 54 may include at least one friction adjustable lock 56 at the bridge first end that is configured to selectively hold the bridge 54 and the central framework 52 at a selected pivotal position relative to one another (FIG. 4b). It is understood that as the lock 56 is loosened by a user, the pivot angle of the bridge 54 and central framework 52 may be changed. Conversely, as the lock 56 is tightened, the pivot angle becomes fixed. It is important to be able to adjust this angle when the upper frame portion 50 is moved from the stowed configuration (not in use) to the expanded configuration (in use) as will be described more fully later.

Figure 3A:
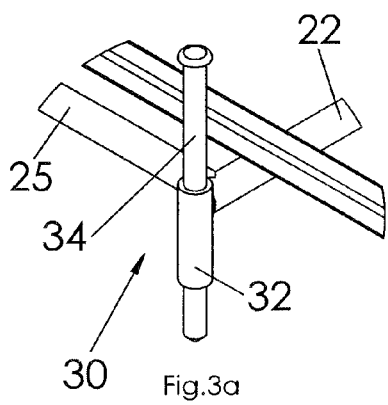
FIG. 3a is an isolated view on an enlarged scale of a portion of the apparatus taken from FIG. 1.
Figure 3B:
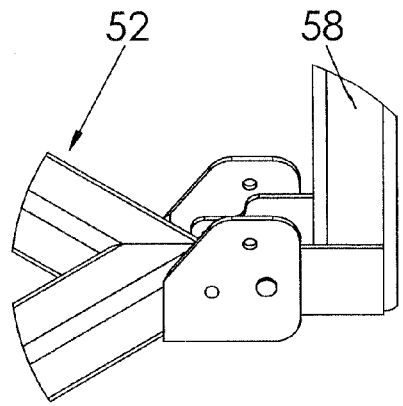
FIG. 3b is an isolated view on an enlarged scale of a portion of the apparatus taken from FIG. 1.
Figure 3C:
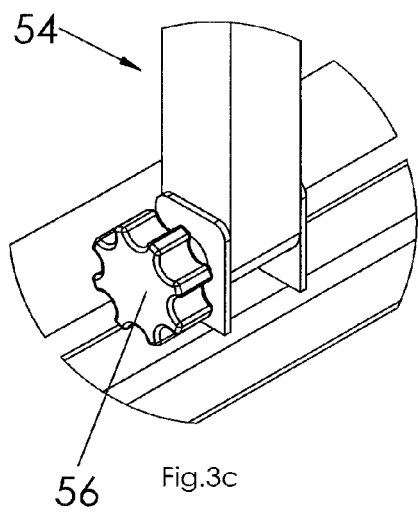
FIG. 3c is an isolated view on an enlarged scale of a portion of the apparatus taken from FIG. 1.
Figure 3D:
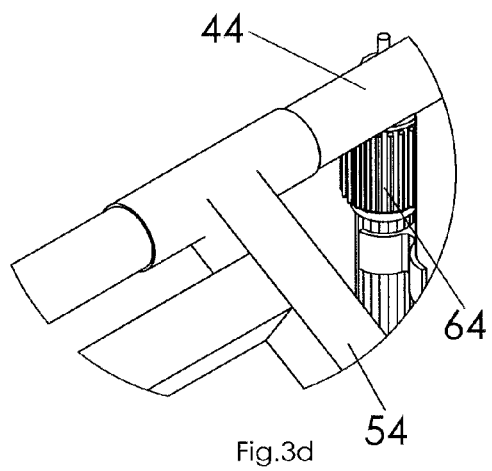
FIG. 3d is an isolated view on an enlarged scale of a portion of the apparatus taken from FIG. 1.
Figure 3E:
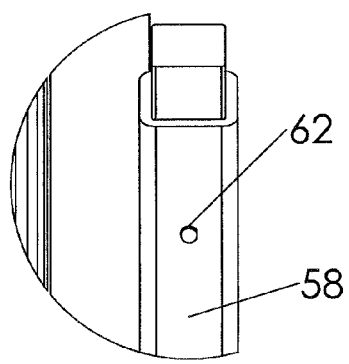
FIG. 3e is an isolated view on an enlarged scale of a portion of the apparatus taken from FIG. 1.
Figure 4E:
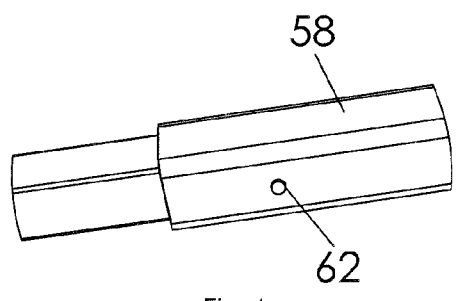
FIG. 4e is an isolated view on an enlarged scale of a portion of the apparatus taken from FIG. 2.

The upper frame portion 50 may include a plurality of legs 58 spaced apart from one another and pivotally coupled to the central framework 52. Each leg 58 is configured and coupled to the central framework 52 so as to extend outwardly therefrom (FIG. 2). Each leg 58 includes a free end 60 to which the canopy 70 may be attached. In some embodiments, the legs 58 may each be length adjustable. As shown particularly in FIG. 4e, each leg 58 may include one or more auxiliary legs nested inside another leg and may define a plurality of spaced apart holes into which a respective pin 62 may be inserted (FIGS. 3e and 4e). In other embodiments, other traditional telescopic may also be utilized such as a spring steel fastener or spring-loaded pin configuration. As shown particularly in FIG. 4a, each leg 58 may be pivotally coupled to a corner of the central framework 52 or to another suitable location, such as with a hinge.

The central framework 52 may include one or more support members arranged in a generally square configuration although a circular, oval, or solid configuration may also work. In some embodiments, the central framework 52 may include a solid panel (not shown) that may serve as a floor when the upper frame portion 50 is at the stowed configuration (FIG. 1). The plurality of legs 58 may extend from corners of the central framework 52 or from other spaced apart locations as would be consistent with the teaching and drawings of this apparatus 10.

The present apparatus 10 may also include at least one ground stake 30 attached to the lower frame portion 20, such as to a respective front support member 22 or side support member 25 (FIGS. 1 and 2). A respective ground stake 30 may include a mounting portion 32 and a stake portion 34. Each ground stake 30 is configured such that a stake portion 34 is movable between a retracted configuration situated above a ground surface and a deployed configuration extending below the ground surface. In use, a ground stake 30 is deployed to anchor the apparatus 10 while the upper frame portion 50 is raised to the expanded configuration (FIG. 5).

Further, the apparatus 10 may include at least one elongate support pole 64 that may be removably coupled to a respective upstanding support bar 42 of the rear frame portion 40 in a storage configuration (FIG. 1). It is understood that a pole 64 may alternatively be coupled to another frame structure for storage. Each pole 64 is removable from the support bar 42 and may be coupled to a free end of a respective leg 58 extending from the central framework 52 and configured to extend downwardly toward the ground surface. In other words, the support pole 64 may be situated to provide support to the upper frame portion 50. It is understood that this enhanced support may be needed or desirable when the bridge 54 is rotated greater than 180 degrees and the central framework 52 and canopy 70 are situated rearwardly of the lower and rear frame portions—which may be an awkward or top heavy configuration. In addition, each support pole 64 may include a length adjustable or telescopic configuration so that it may extend completely between the free end of a respective canopy leg 58 and the ground surface.

Figure 6:
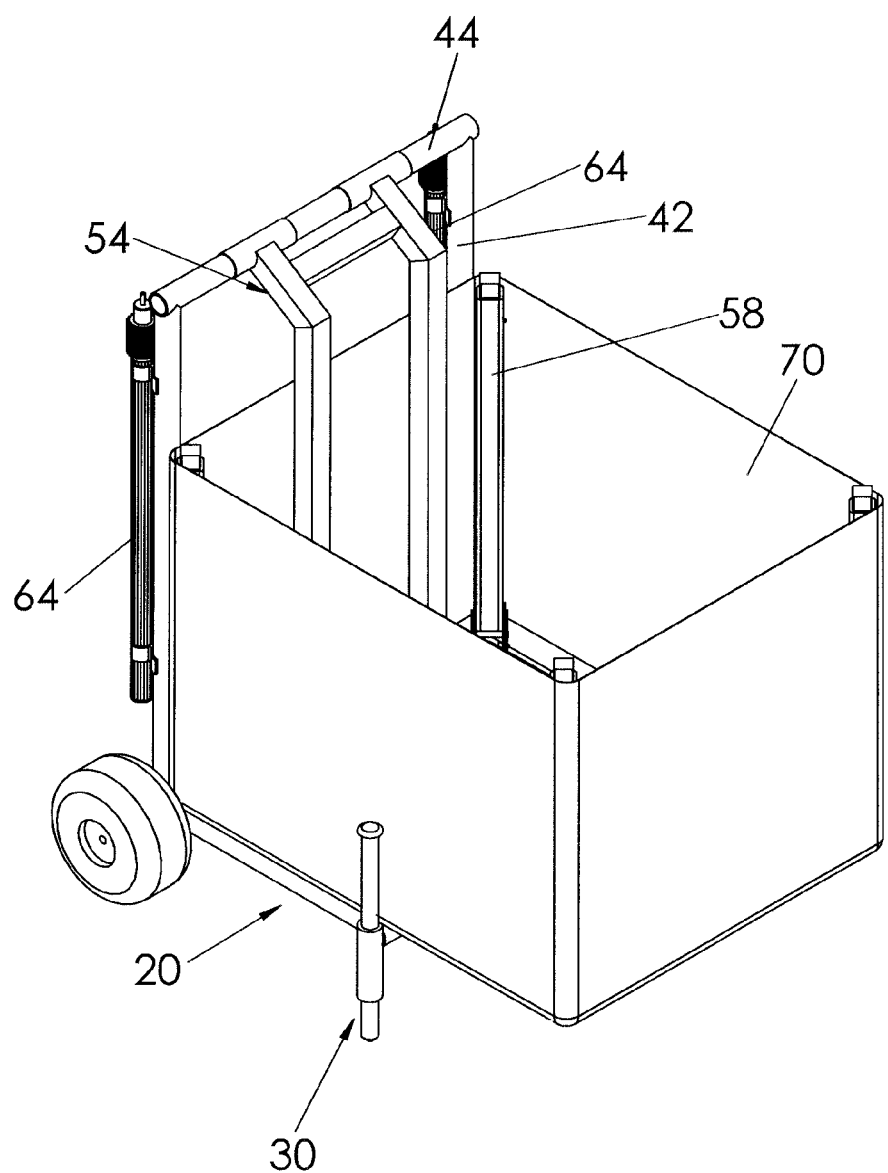
FIG. 6 is a perspective view of the convertible cart and canopy apparatus as in FIG. 1 with a canopy attached to the upper frame portion for clarity of understanding.

In use, the beach cart and canopy apparatus 10 may be loaded with articles, such as for a trip to the beach, when the upper frame portion 50 is at the stowed configuration (FIG. 6). At the stowed configuration, the central framework 52 is adjacent the lower frame portion 20 as best shown in FIG. 1. Each of the legs 58 may be pivoted to an upstanding configuration such that the canopy 70 provides walls to contain articles placed therein. The apparatus 10 may be pushed or pulled as a cart supported and guided by the wheels 26, 28. When the desired location at the beach is reached, the apparatus 10 may be quickly converted into a canopy configured to provide shade.

Figure 5:
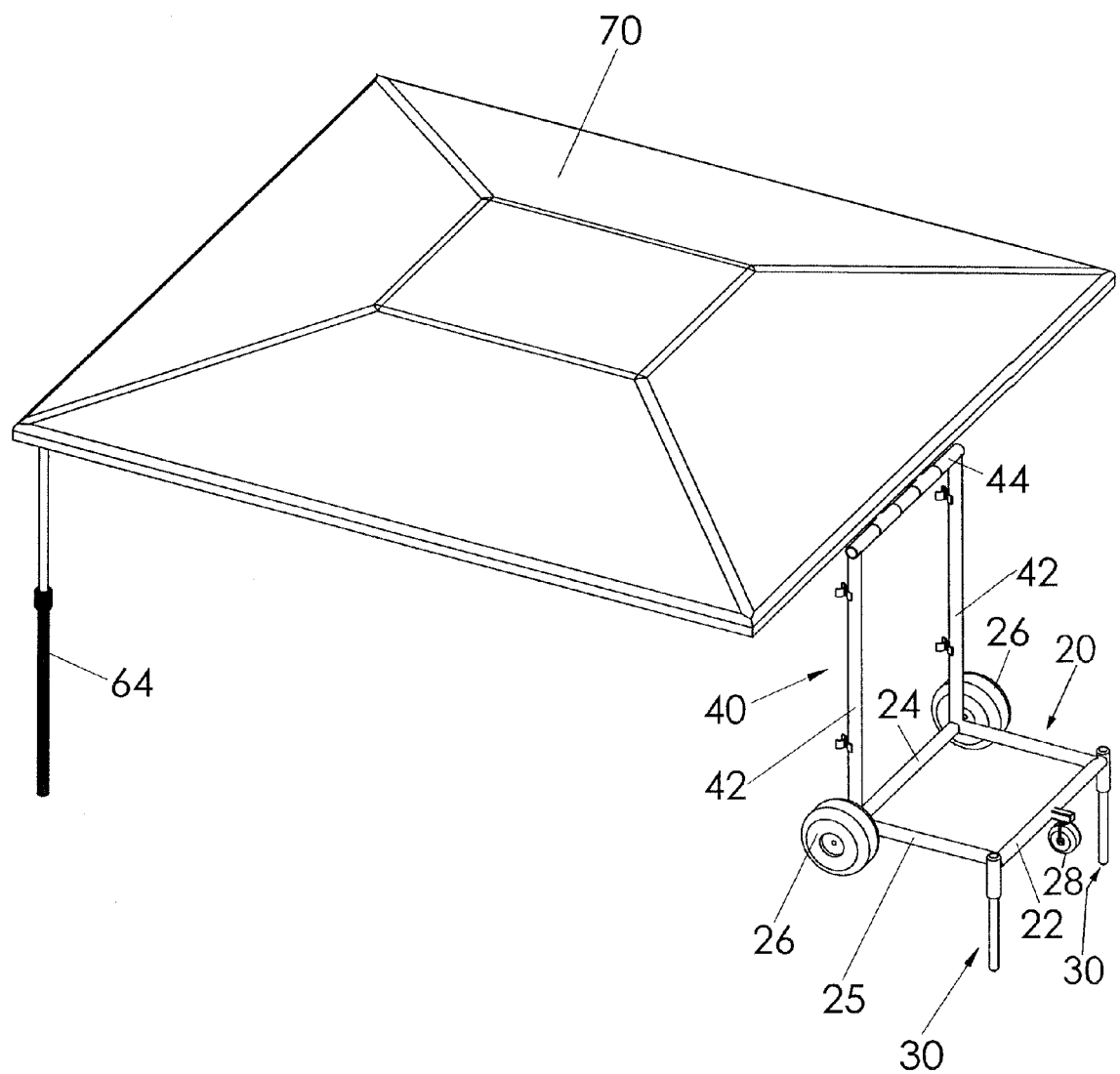
FIG. 5 is a perspective view of the convertible cart and canopy apparatus as in FIG. 2 with a canopy attached to the upper frame portion.

Specifically, the upper frame portion 50 may be rotated about the top support member 44 of the rear frame portion 40 to the expanded configuration (FIGS. 2 and 5). In this configuration, the canopy provides shade to an area adjacent the apparatus 10 and specifically rearwardly adjacent the rear frame portion 40. It is understood that the canopy 70 may be expanded when the legs 58 are lengthened as described. A support pole 64 may also be removed from its storage configuration and coupled to a free end 60 of a respective leg 58 so as to support the canopy. In addition, one or more ground stakes 30 may be deployed into the sand to further stabilize operation. When desired, the apparatus 10 may be returned to a cart configuration in a reverse manner.

It is understood that while certain forms of this invention have been illustrated and described, it is not limited thereto except insofar as such limitations are included in the following claims and allowable functional equivalents thereof.

The invention claimed is:

1. A convertible beach cart and canopy apparatus, comprising:
   a lower frame portion having opposed front and rear support members and opposed side members extending between opposed ends of said front and said rear support members, respectively;
   a pair of wheels rotatably coupled to said opposed ends of said rear support member;
   a rear frame portion including at least one support bar attached to said rear support member and extending upwardly therefrom, said rear frame portion including a top support member coupled to an upper end of said at least one support bar;
   an upper frame portion rotatably coupled to said top support member of said rear frame portion such that said upper frame portion is movable between a stowed configuration generally adjacent said lower frame portion and an expanded configuration extending away from said top support member of said rear frame portion;
   a canopy coupled to an end of said upper frame portion and configured to shade an area adjacent said rear frame portion when said upper frame portion is at said expanded configuration;
   wherein:
      said rear frame portion includes a pair of upstanding support bars attached to said opposed ends of said rear support member, respectively; and
      said top support member is a bar extending between upper ends of said pair of support bars, respectively;
   wherein said upper frame portion includes:
      a central framework; and
      a bridge having a first end pivotally coupled to said central framework and a second end rotatably coupled to said top support bar of said rear frame portion such that said central framework is movable between said stowed configuration at which said central framework is adjacent said lower frame portion and said expanded configuration at which said central framework is extended outwardly from said top support bar of said rear frame portion.

2. The convertible beach cart and canopy apparatus as in claim 1, wherein:
   said upper frame portion includes a plurality legs spaced apart and pivotally coupled to said central framework of said upper frame portion, each leg extending outwardly from said central framework; and
   said canopy is coupled to free ends of said plurality of legs so as to shade the area adjacent said rear frame portion.

3. The convertible beach cart and canopy apparatus as in claim 2, wherein each leg of said plurality of legs is length adjustable.

4. The convertible beach cart and canopy apparatus as in claim 2, wherein each leg of said plurality of legs is pivotally coupled to said central framework.

5. The convertible beach cart and canopy apparatus as in claim 2, further comprising at least one support pole that is movable between a storage configuration removably coupled to a respective outer support bar and a use configuration coupled to a free end of a respective leg, said at least one support pole configured to extend downwardly between said respective free end to a ground surface, whereby to support said respective leg.

6. The convertible beach cart and canopy apparatus as in claim 5, wherein said at least one support pole includes a length adjustable configuration.

7. The convertible beach cart and canopy apparatus as in claim 1, wherein said bridge is configured to rotate more than 180 degrees from said stowed configuration to said expanded configuration such that said canopy is positioned to shade an area rearward of said rear frame portion when said bridge is at said expanded configuration.

8. The convertible beach cart and canopy apparatus as in claim 1, wherein said bridge includes a lock at said first end configured to selectively hold said bridge and said central framework at a selected pivotal position relative to one another.

9. The convertible beach cart and canopy apparatus as in claim 8, further comprising another wheel coupled to said front support member of said lower frame portion.

10. The convertible beach cart and canopy apparatus as in claim 9, wherein said another wheel is a castor wheel configured to rotate 360 degrees.

11. The convertible beach cart and canopy apparatus as in claim 1 further comprising another wheel coupled to said front support member of said lower frame portion.

12. The convertible beach cart and canopy apparatus as in claim 1, further comprising at least one ground stake coupled to said lower frame portion, said at least one ground stake being movable between a retracted configuration above a ground surface and a deployed configuration extending below the ground surface.

13. The convertible beach cart and canopy apparatus as in claim 1, further comprising at least one ground stake coupled to said lower frame portion, said at least one ground stake being movable between a retracted configuration above a ground surface and a deployed configuration extending below the ground surface.

14. A convertible beach cart and canopy, comprising:
   a lower frame portion having opposed front and rear support members and opposed side members extending between opposed ends of said front and said rear support members, respectively;
   a pair of wheels rotatably coupled to said opposed ends of said rear support member;
   a rear frame portion including a pair of support bars fixedly attached to said opposed ends of said rear support member, respectively, and extending upwardly therefrom, said rear frame portion include a top support bar extending between upper ends of said support bars, respectively;
   an upper frame portion having a central framework and a bridge having a first end pivotally coupled to said central framework and a second end rotatably coupled to said top support bar of said rear frame portion such that said central framework is movable between a stowed configuration in which said central framework is adjacent said lower frame portion and an expanded configuration in which said central framework is extended away from said top support bar of said rear frame portion; and a canopy coupled to said central framework and configured to shade an area rearwardly adjacent said rear frame portion when said bridge is at said expanded configuration.

15. The convertible beach cart and canopy apparatus as in claim 14, wherein:
   said upper frame portion includes a plurality length-adjustable legs spaced apart and pivotally coupled to said central framework of said upper frame portion, each leg extending outwardly from said central framework; and
   said canopy is coupled to free ends of said plurality of legs so as to shade the area adjacent said rear frame portion.

16. The convertible beach cart and canopy apparatus as in claim 14, wherein said bridge is configured to rotate more than 180 degrees from said stowed configuration to said expanded configuration such that said canopy is positioned to shade an area rearward of said rear frame portion when said bridge is at said expanded configuration.

17. The convertible beach cart and canopy apparatus as in claim 16, wherein said bridge includes a lock at said first end configured to selectively hold said bridge and said central framework at a selected pivotal position relative to one another.

18. The convertible beach cart and canopy apparatus as in claim 14 further comprising:
   another wheel coupled to said front support member of said lower frame portion;
   at least one ground stake coupled to said lower frame portion, said at least one ground stake being movable between a retracted configuration above a ground surface and a deployed configuration extending below the ground surface; and
   at least one support pole that is movable between a storage configuration removably coupled to a respective outer support bar and a use configuration coupled to a free end of a respective leg, said at least one support pole configured to extend downwardly between said respective free end to a ground surface, whereby to support said respective leg.

* * * * *